(12) United States Patent
Chan

(10) Patent No.: US 7,465,330 B2
(45) Date of Patent: Dec. 16, 2008

(54) FILTER ASSEMBLY AND METHOD OF MAKING A FILTER ASSEMBLY

(75) Inventor: Chi Tong Chan, Hong Kong (HK)

(73) Assignee: Simatelex Manufacturing Company Limited, Hong Kong (HK)

( * ) Notice: Subject to any disclaimer, the term of this patent is extended or adjusted under 35 U.S.C. 154(b) by 299 days.

(21) Appl. No.: 11/166,839

(22) Filed: Jun. 24, 2005

(65) Prior Publication Data
US 2006/0288675 A1 Dec. 28, 2006

(51) Int. Cl.
B01D 46/00 (2006.01)
B01D 50/00 (2006.01)
B01D 35/00 (2006.01)
B65B 7/00 (2006.01)

(52) U.S. Cl. ............................. 55/498; 55/318; 156/69; 210/85

(58) Field of Classification Search ............ 156/69; 55/318, 498; 210/169, 85
See application file for complete search history.

(56) References Cited

U.S. PATENT DOCUMENTS

| | | | | |
|---|---|---|---|---|
| 3,042,571 A | * | 7/1962 | Jackson ........................ 156/191 |
| 3,133,847 A | * | 5/1964 | Millington .................... 156/60 |
| 3,170,826 A | * | 2/1965 | Norton et al. .................. 156/69 |
| 4,498,989 A | | 2/1985 | Miyakawa et al. |
| 4,921,600 A | * | 5/1990 | Meissner .................. 210/167.1 |
| 5,753,071 A | * | 5/1998 | Spencer ...................... 156/446 |
| 6,159,258 A | * | 12/2000 | Ager et al. ..................... 55/318 |
| 6,524,411 B2 | * | 2/2003 | Pulek et al. ................... 156/69 |
| 2003/0085165 A1 | * | 5/2003 | Shane ......................... 210/85 |

FOREIGN PATENT DOCUMENTS

GB 1511002 5/1978

\* cited by examiner

*Primary Examiner*—Walter D. Griffin
*Assistant Examiner*—Amber Miller Harris
(74) *Attorney, Agent, or Firm*—Jackson Walker, LLP

(57) ABSTRACT

A filter assembly has an annular outer wall with a channel for receiving a layer of adhesive and a center ring within the outer wall. A filter media having a plurality of pleats in a closed loop is bonded with adhesive to the outer wall. The assembly is made by rotating the outer wall in a jig and applying a layer of adhesive within the channel. The filter media is positioning the within the outer wall, rotated and allowed to move along a radial path until its outer perimeter contacts the adhesive coated outer wall inner perimeter. The ring is positioned adjacent the filter media inner perimeter.

3 Claims, 7 Drawing Sheets

FILTER ASSEMBLY AND METHOD OF MAKING A FILTER ASSEMBLY

BACKGROUND TO THE INVENTION

1. Field of the Invention

The invention relates to filter assemblies and to methods of making filter assemblies.

2. Description of the Prior Art

Filter assembles comprising a pleated filter media in a housing are well known. In annular shaped filters the filter media is in a closed loop and is bonded between outer and inner plastic sleeves. Known methods for making this shape of filer are not satisfactory because of the difficulty in bonding the sleeves to the filter media. Problems include difficulty in applying adhesive to the entire contact surface, excess adhesive being spread over the filter media and poor bond quality resulting in leakages such that dust could pass through the leaks instead of being blocked by the filter.

SUMMARY OF THE INVENTION

It is an object of the present invention to provide a filter assembly and a method of making a filter assembly that overcomes the above problems or which at least provide the public with a useful alternative.

According to a first aspect of the invention there is provided a filter assembly comprising an annular outer wall having an inner perimeter and first and second edges forming a channel with the inner perimeter for receiving a layer of adhesive, a ring within the outer wall and aligned with one of the edges, a ring-shaped filter media having a plurality of pleats in a closed loop having an outer perimeter and an inner hole, the filter media located with its outer perimeter bonded with adhesive to the outer wall inner perimeter and its hole aligned with the ring.

Preferably, the filter assembly further includes a perforated mesh sleeve within the filter media inner hole.

Preferably, the sleeve is bonded to an inner surface of the filter media inner hole with adhesive.

Preferably, the filter assembly further includes a plurality of radial bars between the outer wall and ring.

According to a second aspect of the invention there is provided a method of making the filter assembly of claim 1 comprising rotating the annular outer wall in a jig, applying a layer of adhesive within the channel of the outer wall inner perimeter, positioning the filter media within the annular outer wall and rotating it, allowing the filter media to move along a radial path until its outer perimeter contacts the outer wall inner perimeter, and inserting the sleeve within the filter media inner hole.

Preferably, prior to inserting the sleeve within the filter media inner hole the annular outer wall is rotated until its inner perimeter is bonded with adhesive to the filter media outer perimeter.

Preferably, the method includes the following steps prior to inserting the center sleeve within the filter media inner perimeter inserting a mesh sleeve to contact the filter media inner hole, and applying a layer of adhesive to the mesh sleeve so that the sleeve is bonded to an inner surface of the filter media inner hole.

Further aspects of the invention will become apparent from the following drawings and description.

BRIEF DESCRIPTION OF THE DRAWINGS

Embodiments of the invention will now be described by way of example only and with reference to the accompanying in which.

DESCRIPTION OF THE PREFERRED EMBODIMENTS

Figure 1:
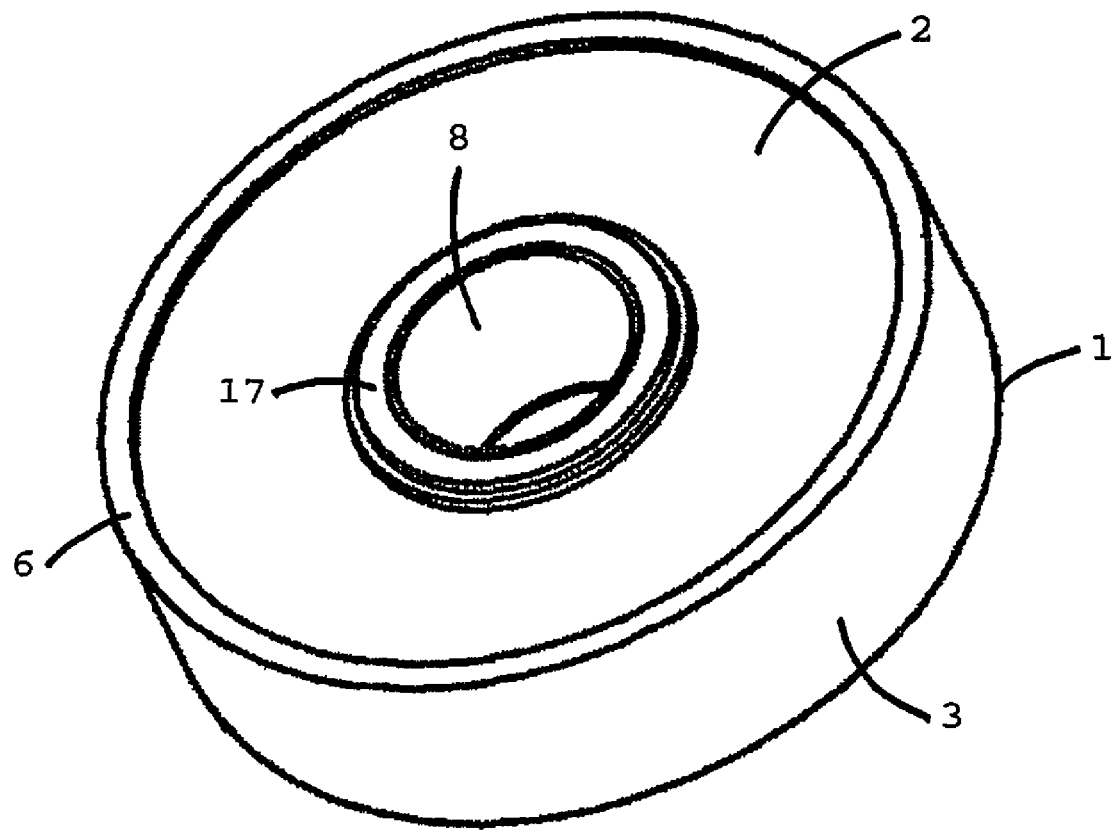
FIG. 1 is a perspective view of a filter assembly according to invention.
Figure 2:
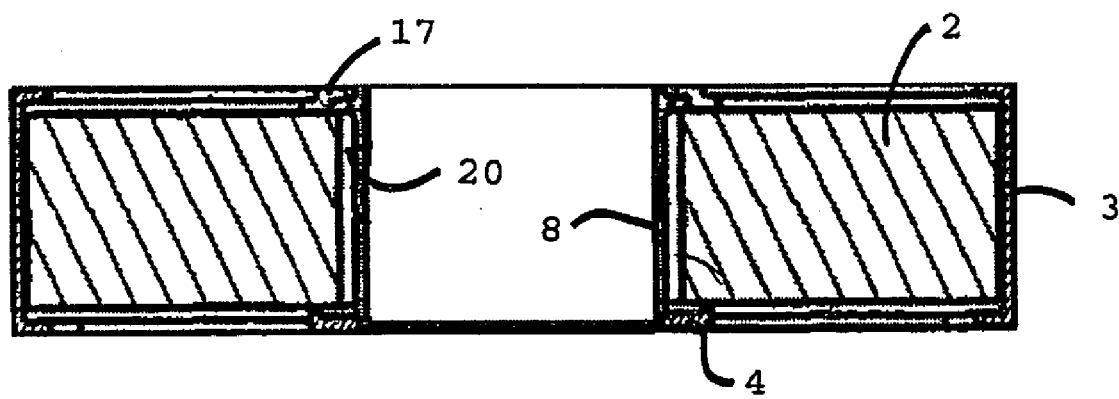
FIG. 2 is a section elevation view through the filter assembly.
Figure 3:
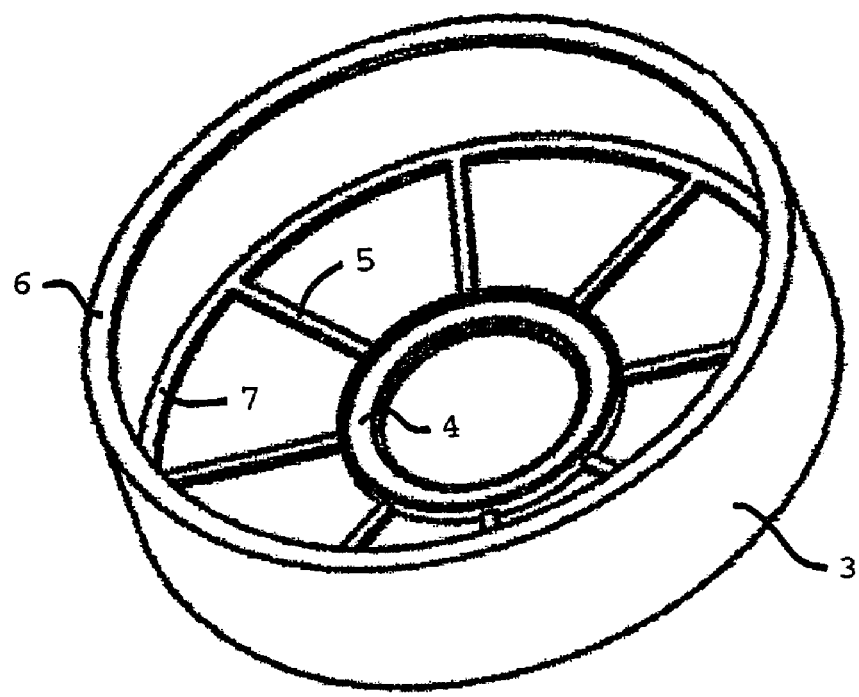
FIG. 3 is a perspective view of the outer parts of the filter assembly housing.
Figure 4:
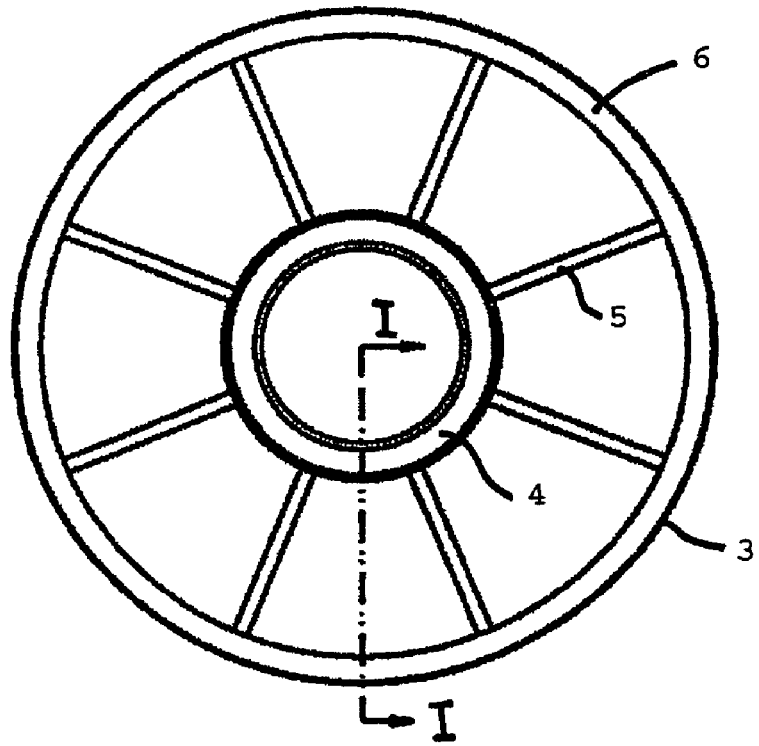
FIG. 4 is a plan view of the parts of FIG. 3.
Figure 5:
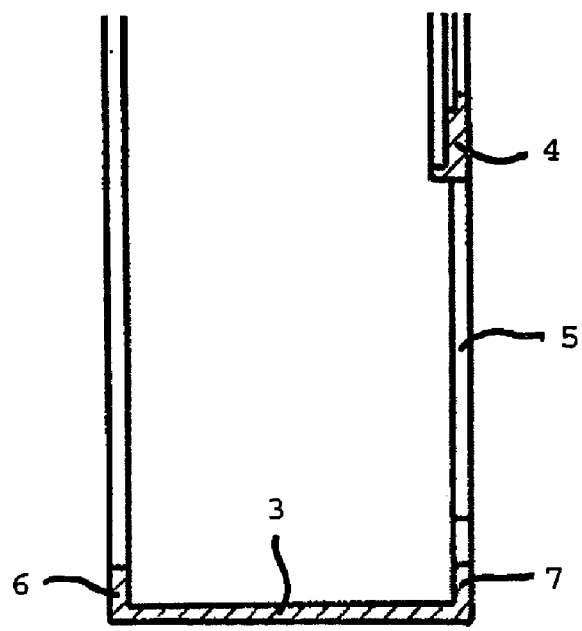
FIG. 5 is a sectional view through I-I of FIG. 4.
Figure 6:
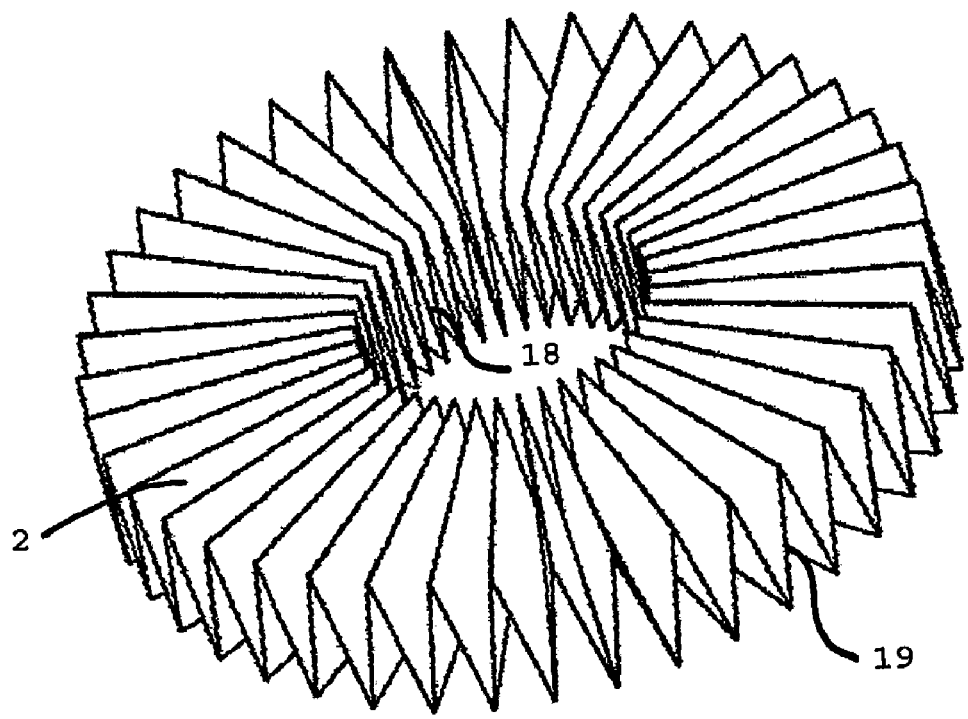
FIG. 6 is a perspective view of the filter element.
Figure 7:
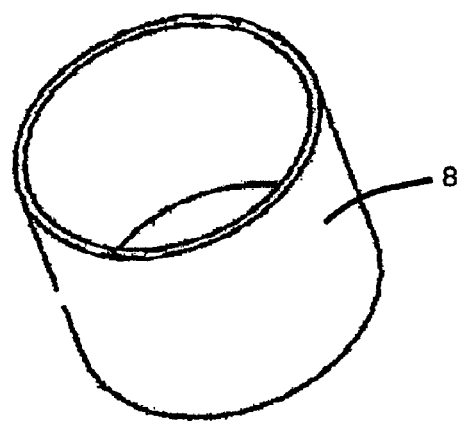
FIGS. 7 to 10 are perspective and section elevation views of the inner parts of the filter assembly housing.
Figure 8:
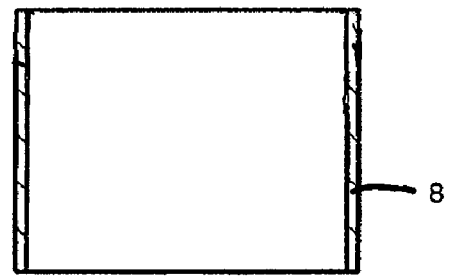
Figure 9:
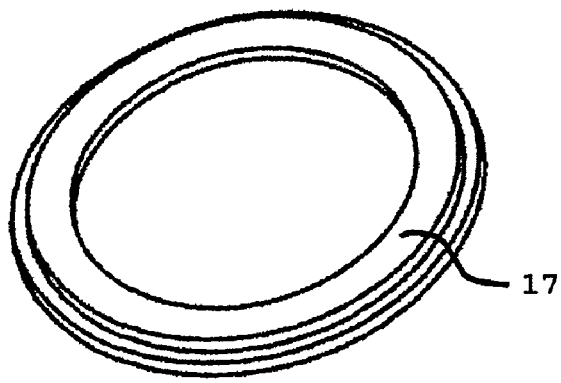
Figure 10:
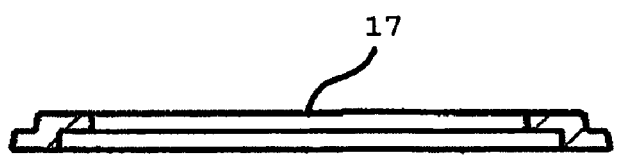
Figure 11:
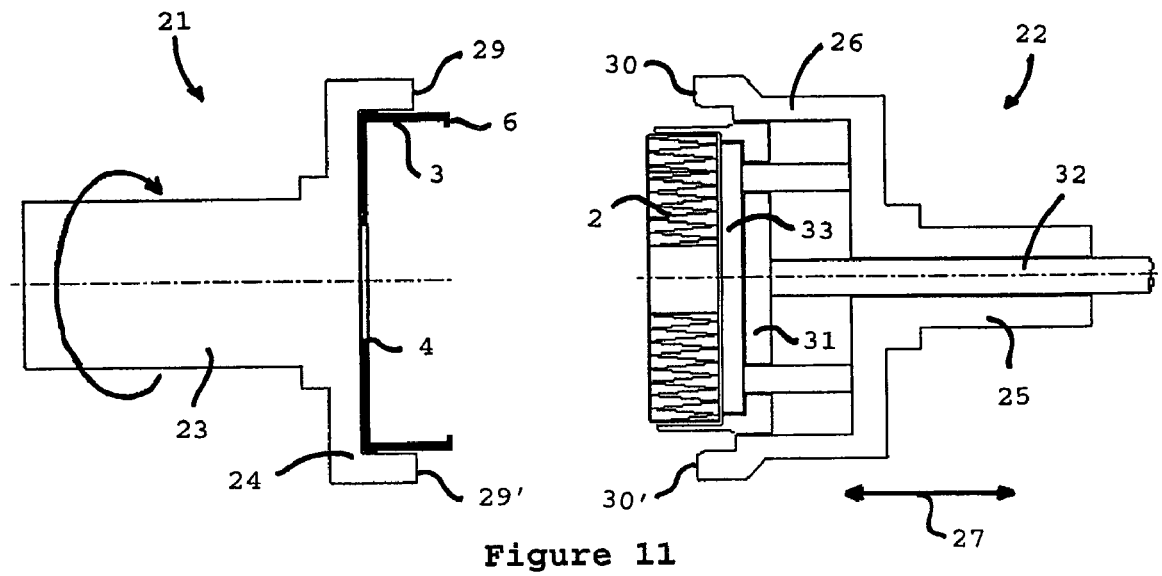
FIGS. 11 to 18 illustrate a method of making the filter assembly.
Figure 12:
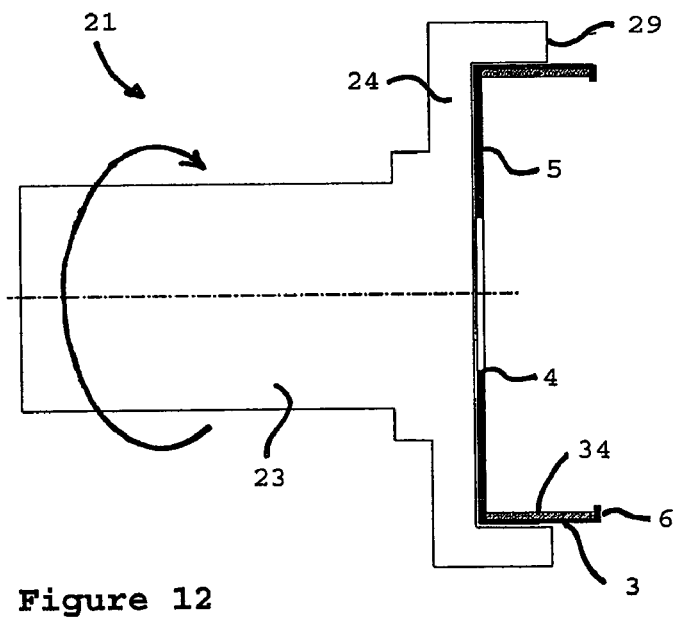

In FIGS. 1 to 10 there is depicted a filter assembly comprising of a filter housing 1 holding a ring-shaped pleated filter element 2. The filter housing 1 is cylindrical in shape and is manufactured from a suitable plastics material. The filter housing 1 consists of a cylindrical outer wall 3 and a coaxial center ring 4 connected to the outer wall 3 by a plurality of radially projecting bars or spokes 5. The outer wall 3 is U-shaped in cross section forming a channel between inwardly projecting lips 6 and 7 extending from its axial edges. The center ring 4 and radially projecting spokes 5 are aligned with lip 7 of the outer wall 3. The cylindrical outer wall 3, center ring 4 and spokes 5 are manufactured integrally by means of known plastics forming techniques.

The ring-shaped pleated filter element 2 has radially arranged pleats in a closed loop between an outer perimeter 19 and a central hole with an inner perimeter 18. The outer perimeter 19 locates within the inner perimeter channel of the cylindrical outer wall 3 and is bonded to the outer wall 3 with adhesive. The central hole of the filter is aligned with the housing ring 4. Located within the central hole and surrounded by inner perimeter 18 is a nylon mesh sleeve 8. A layer of adhesive 20 on the sleeve 8 bonds the sleeve 8 and housing ring 4 to the inner filter element perimeter 18.

An outer ring 17 is positioned over the end of nylon mesh sleeve 8 and central hole of the filter.

Figure 13:
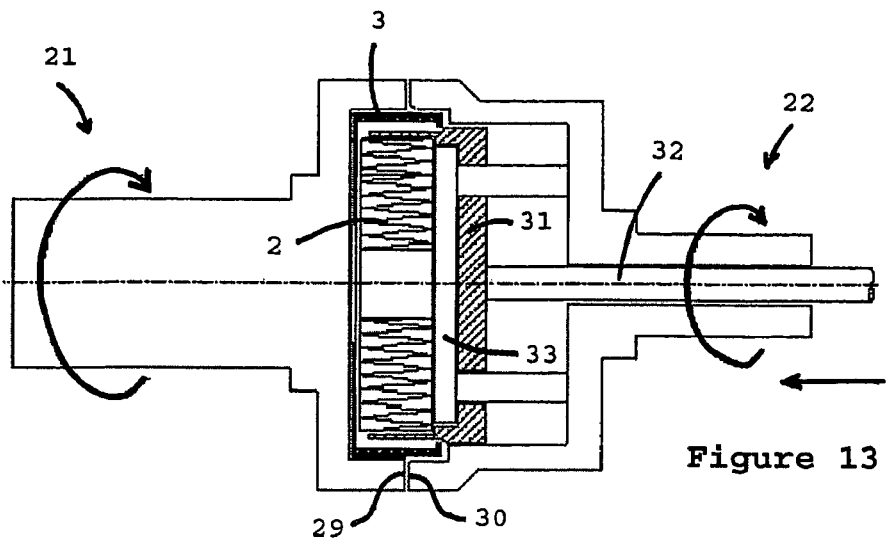
Figure 14:
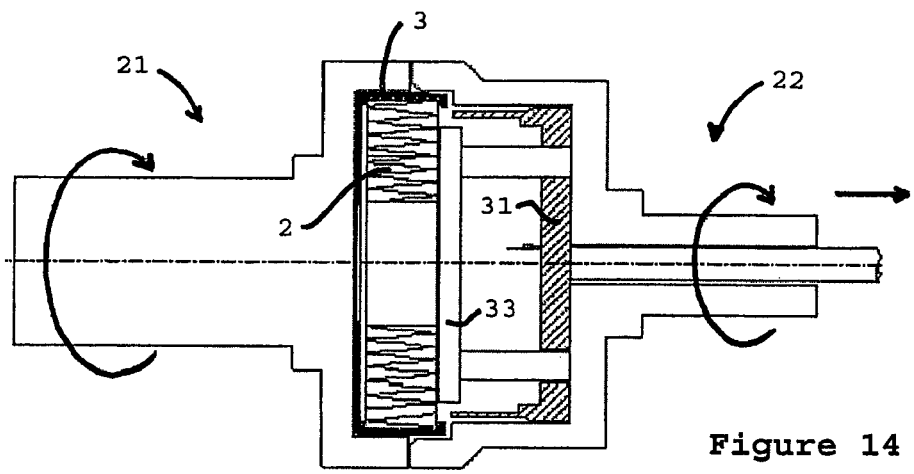

FIGS. 11 to 18 depicted an apparatus and method for assembling the filter assembly. The apparatus comprises two rotational jigs 21, 22. The first jig 21 comprises a rotationally driven spindle 23 with a c-shaped chuck 24 for holding the cylindrical outer wall 3 with center ring 4 during assembly. The spindle 23 is driven by a motor (not shown) in known manner. The second jig 22 comprises a hollow spindle 25 with a c-shaped cup 26 at its end. The second jig 22 is rotationally mounted but is not connected to a drive means. The second jig 22 is also mounted for movement in either direction along its rotational axis as indicated by arrow 27. A contact face 29 on chuck 24 and a corresponding contact faced 30 on c-shaped cup 26 both have a high friction coating on their respective surfaces. When second jig 22 is moved so that contact faces 29 and 30 engage as shown in FIGS. 13 and 14 the second jig 22 is caused to rotate at the same speed as first jig 21.

Located within c-shaped housing 26 is a second chuck 31. Second chuck 31 is mounted on a rotational shaft 32 located within hollow spindle 25. Shaft 32 is keyed with spindle 25 so that it rotates with the second jig 22 but is independently moveable in either direction along the rotational axis as indicated by arrow 27. The back plate 33 of second chuck 31 is fixed with jig 22.

Figure 15:
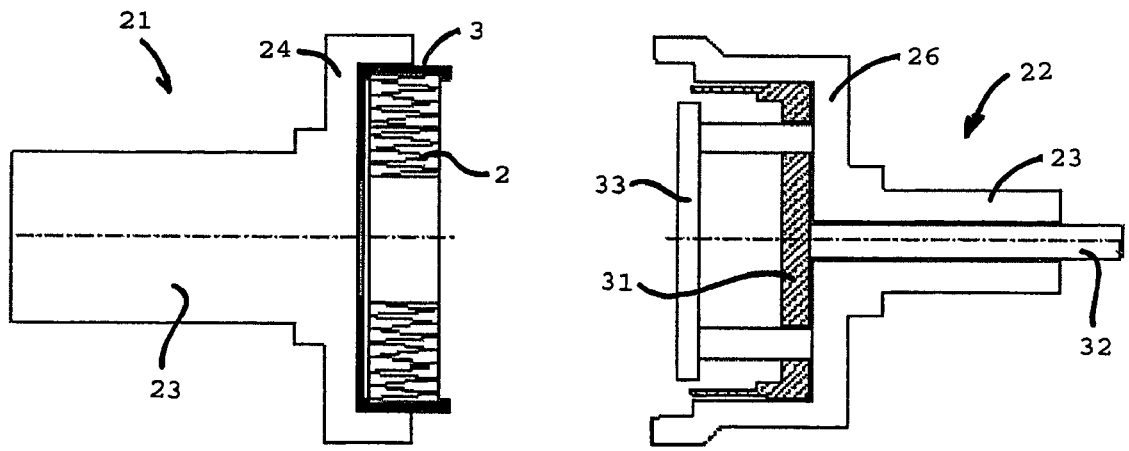

The first step in assembling the filter is to place cylindrical outer wall 3 with center ring 4 in chuck 24 of jig 21, and filter element 2 in chuck 31 of second jig 22. Next, jig 21 is rotated by the motor and a layer of adhesive 34 deposited within the inner perimeter channel of cylindrical wall 3. Centrifugal force from rotation of the jig 21 evenly and thinly distributes the adhesive around the inner perimeter channel. Second jig 22 is then moved along its rotational axis to engage with first jig 21, as shown in FIG. 13. Friction between engagement services 29 and 30 causes second jig 22 to rotate at the same speed as jig 21. The initial position of second chuck 31 locates the filter element 2 within cylindrical outer wall 3. Shaft 32 is moved back along the rotational axis to withdraw second chuck 31, as shown in FIG. 14. Filter element 2 is held in place by back plate 33 and when chuck 31 is withdrawn it expands radially outwards under centrifugal force so that its outer perimeter 19 contacts the adhesive coated inner perimeter of outer wall 3. The jigs 21, 22 are kept in place and rotated while the adhesive goes-off. Second jig 22 is then moved clear of jig 21 as shown in FIG. 15.

Figure 16:
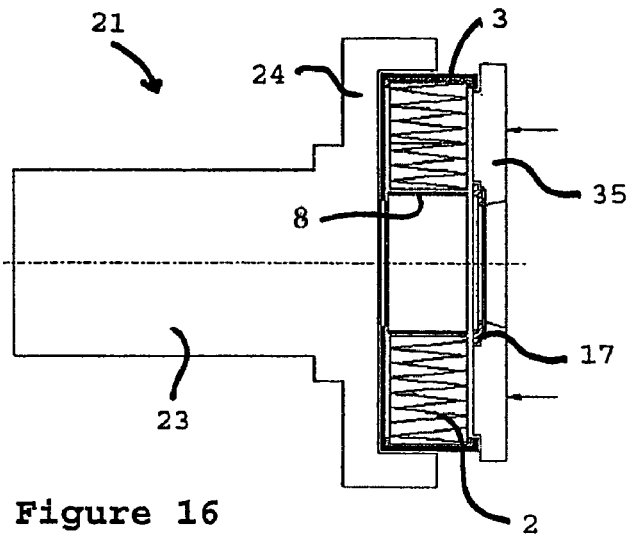
Figure 17:
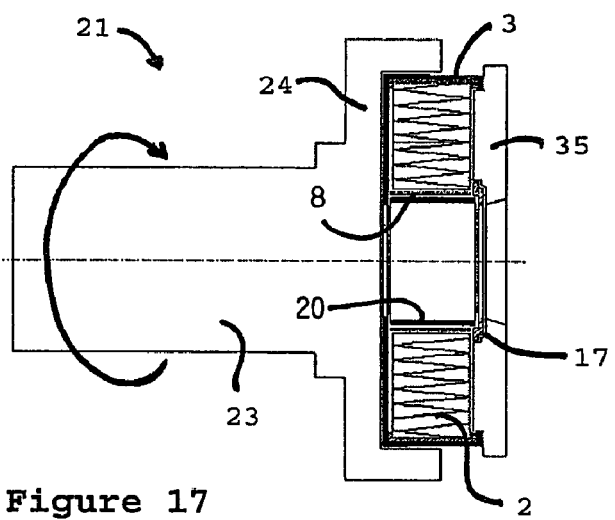
Figure 18:
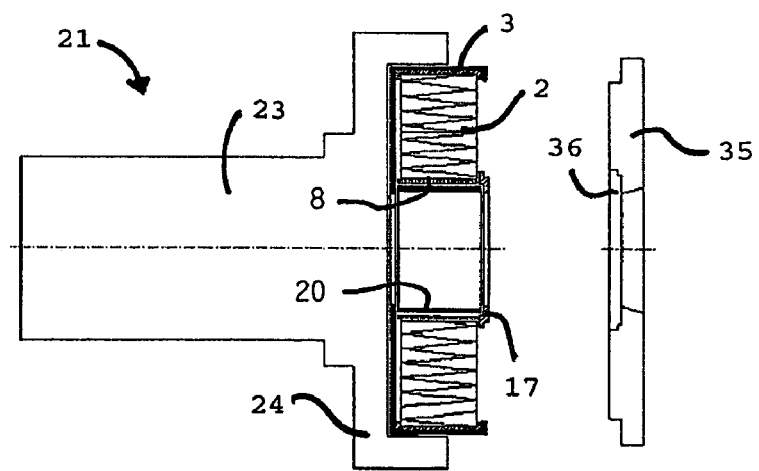

In the next step, shown in FIG. 16, the nylon mesh sleeve 8 is inserted into the filter element hole and surrounded by the inside perimeter 18. The cover ring 17 is mounted and supported in the third chuck 35. With the first jig 21 rotating the third chuck 35 is used to insert the cover ring 17 onto the nylon sleeve 8 and inner perimeter 18 of filter element 2. In FIG. 17, with the jig still rotating a second adhesive layer 20 is deposited on the nylon mesh sleeve 8 and passes through pores of the mesh to contact the inside surface 18 of the filter element hole and underneath surface of rings 4 and 17. The mesh sleeve 8 helps to evenly distribute the adhesive 20 onto the filter element inner surface 18 and rings 4 and 17. The adhesive 20 bonds the sleeve 8 and rings 4 and 17 to the filter element inner perimeter 18. When the adhesive has cured the chuck 35 is moved, FIG. 18, and the filter assembly removed from the apparatus.

Where in the foregoing description reference has been made to integers or elements having known equivalents then such are included as if individually set forth herein.

Embodiments of the invention have been described, however it is understood that variations, improvement or modifications can take place without departure from scope of the appended claims.

What is claimed is:

1. A method of making a filter assembly having an outer wall with an inner perimeter and circumferential first and second lips extending from edges of the outer wall to form a channel with the inner perimeter, a ring-shaped filter media having a plurality of pleats in a closed loop, the filter media having an outer perimeter and an inner hole, the method comprising:

rotating the outer wall in a jig, and applying a layer of adhesive within the channel of the outer wall inner perimeter, positioning the filter media within the outer wall and rotating the outer wall whereby, the filter media expands radially until its outer perimeter contacts the outer wall inner perimeter.

2. The method of claim 1 including the following steps:

inserting a mesh sleeve into the filter media inner hole, and applying a layer of adhesive to the mesh sleeve so that the sleeve is bonded to an inner surface of the filter media inner hole.

3. The method of claim 2 wherein prior to inserting the sleeve within the filter media inner hole the annular outer wall is rotated until its inner perimeter is bonded with adhesive to the filter media outer perimeter.

\* \* \* \* \*

UNITED STATES PATENT AND TRADEMARK OFFICE
CERTIFICATE OF CORRECTION

PATENT NO.       : 7,465,330 B2                                   Page 1 of 1
APPLICATION NO.  : 11/166839
DATED            : December 16, 2008
INVENTOR(S)      : Chi Tong Chan It is certified that error appears in the above-identified patent and that said Letters Patent is hereby corrected as shown below:

Title Page; item (73); should read;
Assignee: Simatelex Manufactory Company Limited, Hong Kong (HK)

Signed and Sealed this

Nineteenth Day of May, 2009

JOHN DOLL
*Acting Director of the United States Patent and Trademark Office*